United States Patent
Gonze et al.

(10) Patent No.: US 9,016,045 B2
(45) Date of Patent: Apr. 28, 2015

(54) ELECTRICALLY HEATED CATALYST DEVICE HAVING A VARIABLE RESISTANCE MONOLITH

(75) Inventors: Eugene V. Gonze, Pinckney, MI (US); Michael J. Paratore, Jr., Howell, MI (US); Chang H. Kim, Rochester, MI (US); Charles E. Solbrig, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 240 days.

(21) Appl. No.: 13/604,123

(22) Filed: Sep. 5, 2012

(65) Prior Publication Data
US 2014/0060014 A1     Mar. 6, 2014

(51) Int. Cl.
| | |
|---|---|
| *F01N 3/18* | (2006.01) |
| *F01N 3/10* | (2006.01) |
| *F01N 3/20* | (2006.01) |
| *F01N 9/00* | (2006.01) |
| *F01N 13/00* | (2010.01) |

(52) U.S. Cl.
CPC *F01N 9/00* (2013.01); *F01N 3/106* (2013.01); *F01N 3/2026* (2013.01); *F01N 3/2066* (2013.01); *F01N 13/009* (2014.06); *H02P 2101/45* (2015.01); *Y02T 10/24* (2013.01); *Y02T 10/26* (2013.01); *Y02T 10/47* (2013.01)

(58) Field of Classification Search
CPC ...... F01N 3/027; F01N 3/2013; F01N 3/2026; F01N 2240/16; H02P 2009/002
USPC .................... 60/284, 286, 300, 303
See application file for complete search history.

(56) References Cited

U.S. PATENT DOCUMENTS

2008/0307774 A1* 12/2008 Gonze et al. ............ 60/286
2012/0048844 A1*  3/2012 Paparelli ............... 219/497

\* cited by examiner

*Primary Examiner* — Kenneth Bomberg
*Assistant Examiner* — Jonathan Matthias
(74) *Attorney, Agent, or Firm* — Cantor Colburn LLP

(57) ABSTRACT

An exhaust gas treatment system for an internal combustion engine is provided and includes an exhaust gas conduit, a generator, an electrically heated catalyst ("EHC") device, and a control module. The exhaust gas conduit is in fluid communication with, and is configured to receive an exhaust gas from the internal combustion engine. The generator operates at a generator speed to produce electrical power. The EHC device is in fluid communication with the exhaust gas conduit. The EHC device includes a monolith structure that is divided into a plurality of segments that define discrete resistive paths. The resistive paths are selectively connected to the generator for receiving electrical power. The control module is in communication with the EHC device, the generator, and the internal combustion engine. The control module includes control logic for determining the generator speed.

20 Claims, 4 Drawing Sheets

ELECTRICALLY HEATED CATALYST DEVICE HAVING A VARIABLE RESISTANCE MONOLITH

FIELD OF THE INVENTION

Exemplary embodiments of the invention relate to exhaust gas treatment systems for internal combustion engines and, more particularly, to an exhaust gas treatment system that includes an electrically heated catalyst ("EHC") device having a monolith divided into a plurality of segments that define discrete resistive paths.

BACKGROUND

The exhaust gas emitted from an internal combustion engine is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). Catalyst compositions typically disposed on catalyst supports or substrates are provided in an engine exhaust system to convert certain, or all of these exhaust constituents into non-regulated exhaust gas components.

One type of exhaust treatment technology for reducing CO and HC emissions is an oxidation catalyst ("OC") device. The OC device includes a flow-through substrate with a catalyst compound applied to the substrate. The catalyst compound of the OC device induces an oxidation reaction of the exhaust gases once the OC device has attained a threshold or light-off temperature. One type of exhaust treatment technology for reducing $NO_x$ emissions is a selective catalyst reduction ("SCR") device. The SCR device includes a substrate, where a SCR catalyst compound is applied to the substrate. A reductant is typically sprayed into hot exhaust gases upstream of the SCR device. However, the SCR device also needs to reach a threshold or light-off temperature to effectively reduce $NO_x$. Following a cold start of the engine, the OC device and the SCR device have not attained the respective light-off temperatures, and therefore generally may not effectively remove CO, HC, and $NO_x$ from the exhaust gases.

One approach for increasing the effectiveness of the OC and the SCR devices involves providing an electrically heated catalyst ("EHC") device upstream of the OC device and the SCR device. The EHC device includes a monolith and an electrical heater. The electrical heater of the EHC device is heated to a respective light-off temperature, which is the temperature at which rapid HC oxidation occurs within an oxidation catalyst compound disposed on the EHC device, and also provides heat to the OC and the SCR devices as well.

In one approach, the EHC device may be powered by a generator. The generator has an internal resistance, which is referred to as the resistance of the generator. The amount of electrical power transferred to the EHC device from the generator reaches a peak when a load resistance (e.g., the resistance of the EHC device) is generally the same as the resistance of the generator. Accordingly, it is desirable to provide an approach for effectively providing electrical power to the electrical heater of the EHC device.

SUMMARY OF THE INVENTION

In one exemplary embodiment of the invention, an exhaust gas treatment system for an internal combustion engine is provided and includes an exhaust gas conduit, a generator, an electrically heated catalyst ("EHC") device, and a control module. The exhaust gas conduit is in fluid communication with, and is configured to receive an exhaust gas from the internal combustion engine. The generator operates at a generator speed to produce electrical power. The EHC device is in fluid communication with the exhaust gas conduit. The EHC device includes a monolith structure that is divided into a plurality of segments that define discrete resistive paths. The resistive paths are selectively connected to the generator for receiving electrical power. The control module is in communication with the EHC device, the generator, and the internal combustion engine. The control module includes control logic for determining the generator speed.

The above features and advantages and other features and advantages of the invention are readily apparent from the following detailed description of the invention when taken in connection with the accompanying drawings.

DESCRIPTION OF THE EMBODIMENTS

Figure 1:
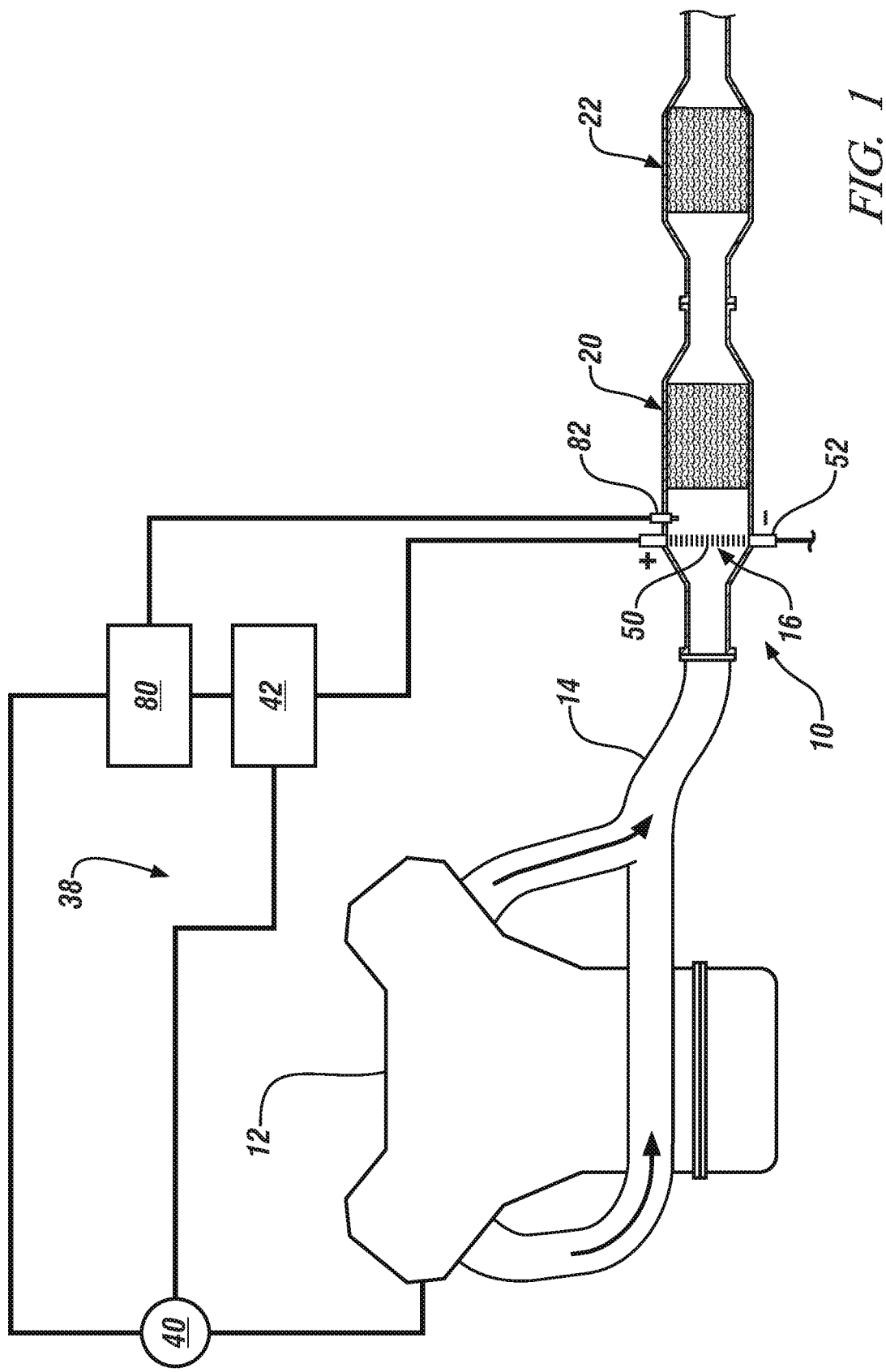
FIG. 1 is a schematic diagram of an exemplary exhaust gas treatment system and electrical system.

The following description is merely exemplary in nature and is not intended to limit the present disclosure, its application or uses. It should be understood that throughout the drawings, corresponding reference numerals indicate like or corresponding parts and features. As used herein, the term control module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an exemplary embodiment is directed to an exhaust gas treatment system 10, for the reduction of regulated exhaust gas constituents of an internal combustion ("IC") engine 12. The exhaust gas treatment system described herein can be implemented in various engine systems that may include, but are not limited to, diesel engine systems, gasoline engine systems, and homogeneous charge compression ignition engine systems.

The exhaust gas treatment system 10 generally includes one or more exhaust gas conduits 14, and one or more exhaust treatment devices. FIG. 1 illustrates an electrically heated catalyst ("EHC") device 16, an oxidation catalyst device ("OC") 20, and a selective catalytic reduction device ("SCR") 22. As can be appreciated, the exhaust gas treatment system of the present disclosure may include various combinations of one or more of the exhaust treatment devices shown in FIG. 1, and/or other exhaust treatment devices (not shown), and is not limited to the present example. An electrical power system 38 is also illustrated and includes a generator 40 and a switching network 42.

The EHC device 16 is disposed upstream of the OC device 20 and the SCR device 22. The EHC device 16 includes a monolith 50 and an electrical heater 52, where the electrical heater 52 is selectively activated and heats the monolith 50. In one embodiment, the electrical heater 52 operates at a voltage of about 12-24 volts and at a power range of about 1-6 kilowatts, however it is understood that other operating conditions may be used as well. The EHC device 16 may be constructed of any suitable material that is electrically conductive such as a wound monolith 50. An oxidation catalyst compound (not shown) may be applied to the EHC device 16 as a wash coat and may contain platinum group metals such as platinum (Pt), palladium (Pd), rhodium (Rh) or other suitable oxidizing catalysts, or combination thereof. The catalyst of the EHC device 16 has a light-off temperature, which is the temperature at which rapid HC oxidation occurs in the presence of the oxidation catalyst compound of the EHC device 16. In one exemplary embodiment, the EHC light-off temperature is about 250° C.

The OC device 20 is located downstream of the EHC device 16 and may include, for example, a flow-through metal or ceramic monolith substrate that may be packaged in a stainless steel shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC 20 is useful in treating unburned gaseous and non-volatile HC and CO, which are oxidized to form carbon dioxide and water.

The SCR device 22 may be disposed downstream of the OC device 20. In a manner similar to the OC device 20, the SCR device 22 may include, for example, a flow-through ceramic or metal monolith substrate that may be packaged in a stainless steel shell or canister having an inlet and an outlet in fluid communication with the exhaust gas conduit 14. The substrate may include an SCR catalyst composition applied thereto. The SCR catalyst composition may contain a zeolite and one or more base metal components such as iron ("Fe"), cobalt ("Co"), copper ("Cu") or vanadium ("V") which can operate efficiently to convert $NO_x$ constituents in the exhaust gas in the presence of a reductant such as ammonia ("$NH_3$").

Figure 2:
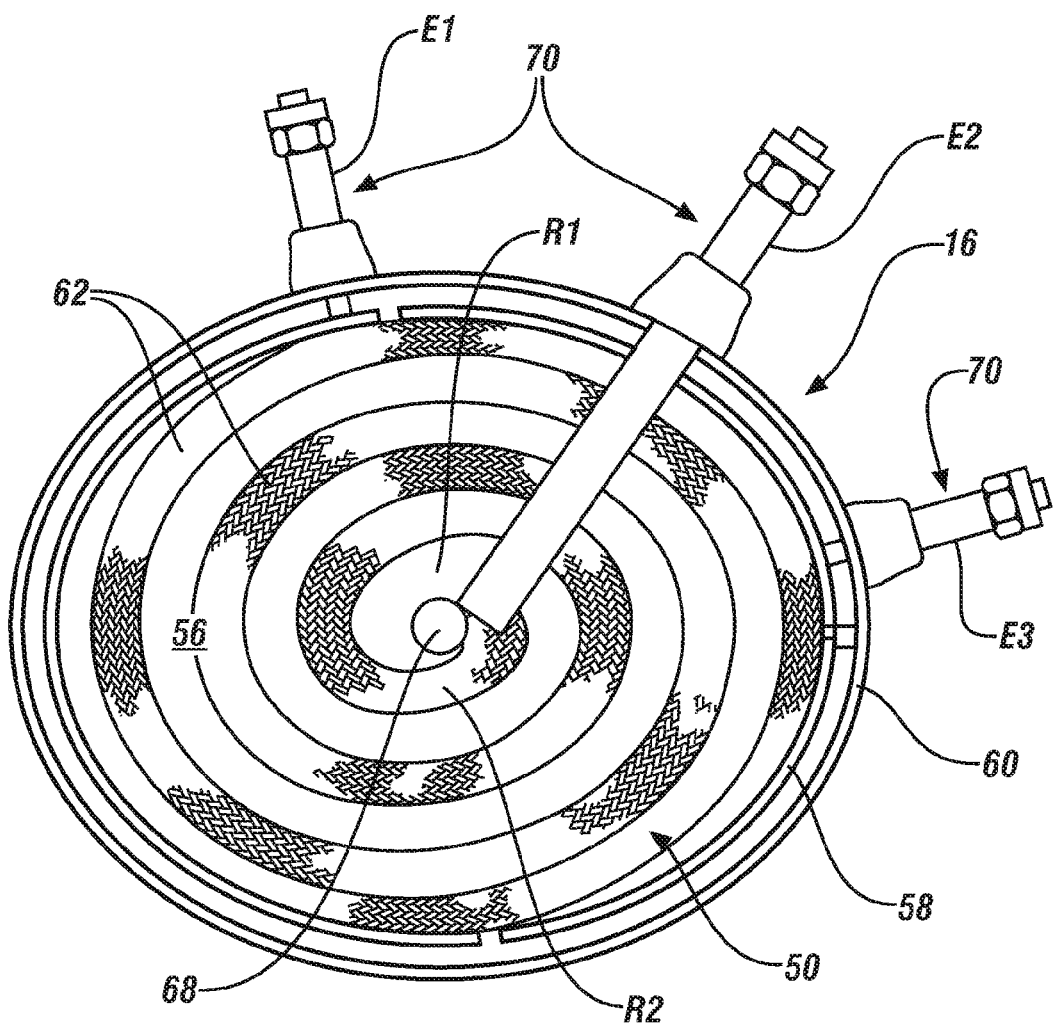
FIG. 2 is an exemplary illustration of an EHC device.

FIG. 2 is an illustration of a front face 56 of the EHC device 16, illustrating the monolith 50 of the EHC device 16. The monolith 50 is contained within a metal-based inner shell or casing 58. The inner casing 58 is concentric with an outer casing 60, also constructed from a metal-based material. In the exemplary embodiment as shown in FIG. 2, the monolith 50 includes a wound configuration, where the monolith 50 is divided into a plurality of resistive paths 62. Specifically, in the embodiment as shown, the monolith 50 includes a first resistive path R1 and a second resistive path R2.

The EHC device 16 also includes a plurality of electrodes 70 which act as the electrical heater 52, and are illustrated as a first electrode E1, a second electrode E2, and a third electrode E3. When the electrodes 70 are electrified, current may flow to the first resistive element R1 and the second resistive element R2, thereby generating heat within the monolith 50. The first electrode E1 is connected to the first resistive path R1. The second electrode E2 is connected to both the first resistive path R1 and the second resistive path R2. An electrical connector 68 is located along a central portion of the monolith 50, and divides the first resistive path R1 and the second resistive path R2. The third electrode E3 is connected to the second resistive path R2.

Figure 3:
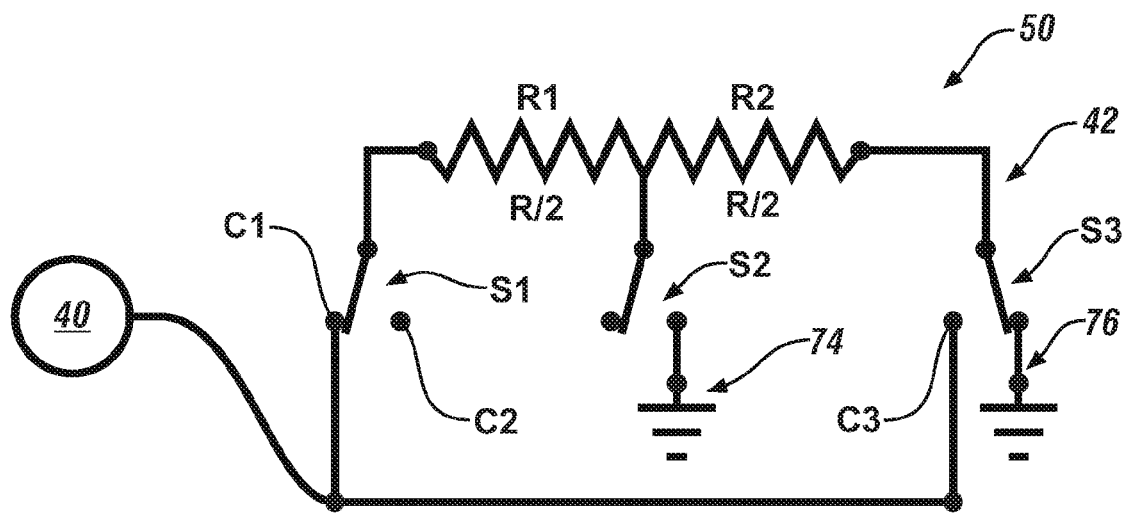
FIG. 3 is a schematic diagram of the EHC device shown in FIG. 2 and a switching network.

FIG. 3 is an exemplary electrical schematic diagram of the monolith 50, where the first resistive element R1 and the second resistive element R2 are illustrated as resistors. A first switching element S1, a second switching element S2, and a third switching element S3, which are part of the switching network 42 shown in FIG. 1, are also illustrated. In the embodiment as shown, the switching elements are illustrated as single-pole double throw switches, however it is to be understood that a variety of switching elements may be used as well such as, for example, transistors. Referring now to FIGS. 2-3, the first switch element S1 corresponds to the first electrode E1. The first switching element S1 selectively connects the first electrode E1 to the generator 40. Specifically, the first switching element S1 selectively connects the first electrode E1 to the generator 40 by connecting to a first contact C1, and selectively disconnects the first electrode E1 from the generator 40 by connecting to a second contact C2. The second switching element S2 selectively connects the second electrode E2 to a ground element 74. Alternatively, the second switching element S2 is in an open position, which is shown in FIG. 3. The third switching element S3 selectively connects the third electrode E3 to either the generator 40, or a ground element 76. Specifically, the third switching element S3 selectively connects the third electrode E3 to the generator 40 by connecting to a third contact C3.

Turning back to FIG. 1, the generator 40 is part of the engine 12, and converts mechanical power from the engine 12 into electrical power needed for various vehicle electrical loads such as the EHC device 16. The generator 32 is coupled to a drivetrain (not illustrated) of a vehicle (not illustrated). During an unfueled braking event, a brake pedal (not illustrated) is pressed by a driver, and fueling to the engine 12 is temporarily stopped. Deceleration energy created by the drivetrain is used to turn the generator 40 to produce electrical energy during the unfueled braking event to provide electrical power to the EHC device 16. The generator 40 includes an internal resistance, which is referred to as a resistance of the generator Rg. The resistance of the generator Rg depends on a rotational speed of the generator 40. Specifically, for example, as the generator 40 increases in rotational speed, the resistance of the generator Rg also increases.

A control module 80 is operably connected to and monitors the engine 12 and the generator 40, the switching network 42 and the exhaust gas treatment system 10 through a number of sensors. Specifically, FIG. 1 illustrates the control module 80 in communication with a temperature sensor 82 located in the exhaust gas conduit 14. The temperature sensor 82 is situated downstream of the EHC device 16, and sends electrical signals to the control module 80 indicating the temperature in the exhaust gas conduit 14 at a specific location. That is, the temperature sensor 82 indicates the temperature of the EHC device 16.

The control module 80 may monitor the engine 12 to determine its rotational speed. In one embodiment, the control module 80 includes control logic for determining the rotational speed of the generator based on the rotational speed of the engine 12 (e.g., the ratio of generator speed to engine speed is generally about 3:1). The control module 80 includes control logic for categorizing the generator speed. For example, in one embodiment, the control module 80 categorizes the generator speed into a category of high, medium, or low. In one illustrative approach, generator speed is categorized as low if the generator speed ranges from about 0 to about 3000 RPM. The generator speed is categorized as medium if the generator speed ranges from about 3000 RPM to about 7500 RPM. The generator speed is categorized as high if the generator speed ranges more than about 7500 RPM.

Referring to FIGS. 1-3, the control module 80 also includes control logic for selectively switching the first switching element S1, the second switching element S2, and the third switching element S3 of the switching network 42 based on the speed of the generator 40. Specifically, the control module 80 includes control logic for generally matching a load resistance (e.g., the resistance of the monolith 50 of the EHC device 16) with the resistance of the generator Rg. For example, in the embodiment as illustrated in FIGS. 1-3, if the generator 40 operates at low speed, then the first resistive path R1 and the second resistive path R2 will be connected to one another using a parallel configuration. Specifically, the first switching element S1 connects the first electrode E1 with the generator 40, the second switching element S2 is connected to the ground 74, and the third switching element S3 connects the third electrode E3 with the generator 40. Thus, if both the first resistive element R1 and the second resistive element R2 both have a resistance of R/2, then the overall resistance of the monolith 50 is ¼ R.

Figure 4A:
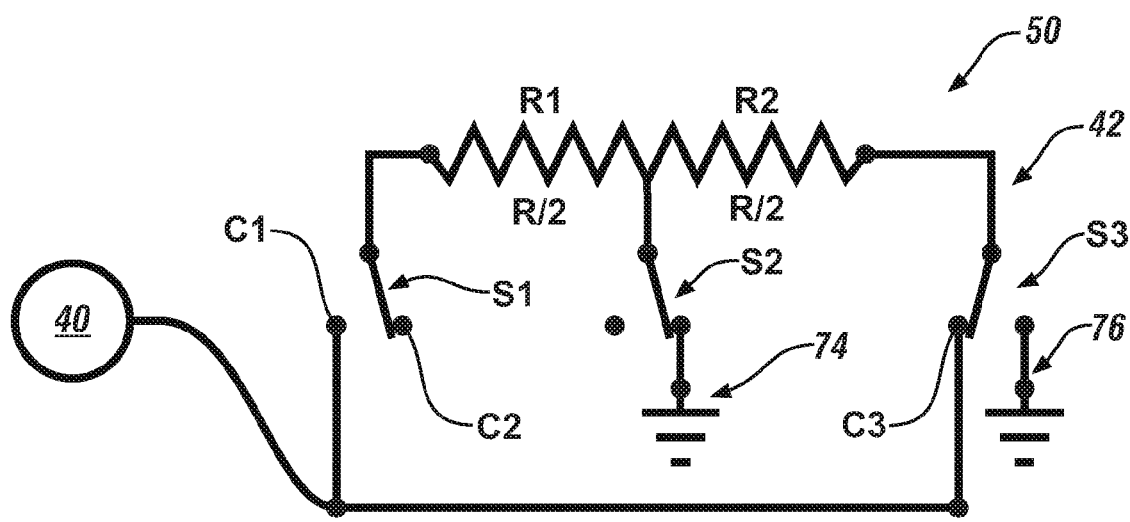
FIGS. 4A-4B are an illustration of the switching network shown in FIG. 3 illustrating a togging scheme.
Figure 4B:
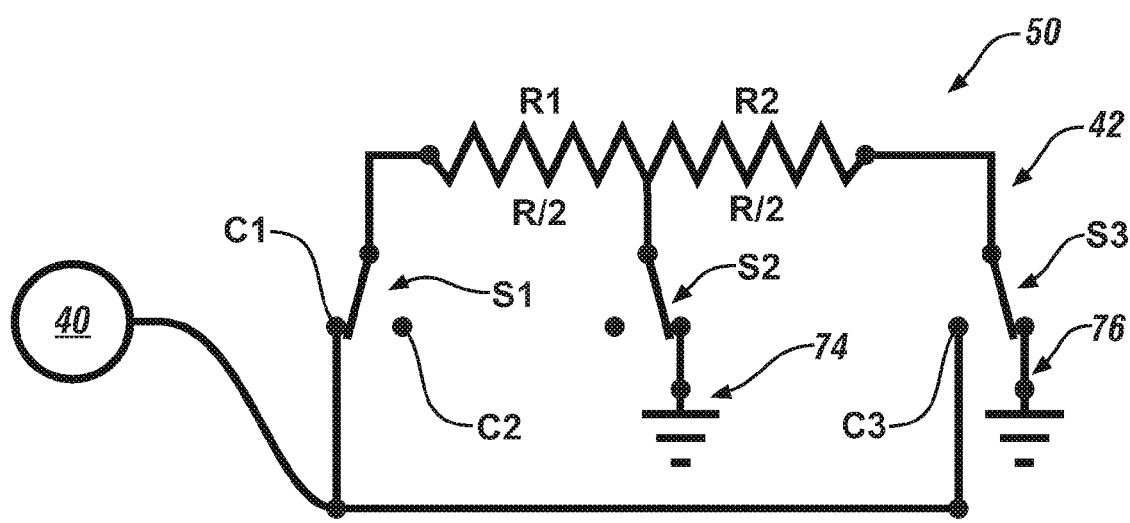

If the generator 40 operates at medium speed, then the first resistive path R1 and the second resistive path R2 are each selectively connected to the generator 40 using a modulation or toggling scheme, which is illustrated in FIGS. 4A-4B. FIG. 4A is an illustration of a toggling scheme to connect the second resistive element R2 to the generator 40, and FIG. 4B is an illustration of a toggling scheme to connect the first resistive element R1 with the generator 40. For example, with reference to FIG. 4A, the first resistive element R1 is disconnected from the generator 40, the second switching element S2 is connected to the ground 74, and the third switching element S3 is connected to the generator 40. With reference to FIG. 4B, the first resistive element R1 is connected to the generator 40, the second switching element S2 is connected to the ground 74, and the third switching element S3 is connected to the ground 76.

With reference to FIGS. 1-4B, the control module 80 includes control logic for modulating between the toggling schemes shown in FIGS. 4A-4B to maintain a generally even temperature profile over the monolith 50 of the EHC device 16. Specifically, for example, the control module 80 may modulate between the toggling schemes based on the temperature of the monolith 50 of the EHC device 16 (e.g., by monitoring the temperature sensor 82). Alternatively, in another approach, the control module 80 may modulate between the toggling schemes based on an electrical power output of the generator 40.

If the generator 40 operates at high speed, then the first resistive path R1 and the second resistive path R2 will be connected to one another using a series configuration. Specifically, the first switching element S1 connects the first electrode E1 with the generator 40, the second switching element S2 is in the open position, and the third switching element S3 connects the third electrode E3 with the ground 76. Thus, if both the first resistive element R1 and the second resistive element R2 both have a resistance of R/2, then the overall resistance of the monolith 50 is R.

The electrical power system 38 (shown in FIG. 1) matches the load resistance (e.g., the resistance of the monolith 50 of the EHC device 16) with the resistance of the generator Rg as the generator 40 operates at varying speed. The amount of electrical power transferred to the EHC device 16 from the generator 40 reaches a peak when the resistance of the monolith 50 of the EHC device 16 is about the same as the resistance of the generator 40. Thus, by matching the overall resistance of the monolith 50 (e.g., the first resistive element R1 and the second resistive element R2) with the resistance of the generator Rg, the amount of electrical power supplied to the electrical heater 52 is maximized during an unfueled braking event (e.g., during deceleration), and heating to the monolith 50 of the EHC device 16 is enhanced.

Figure 5:
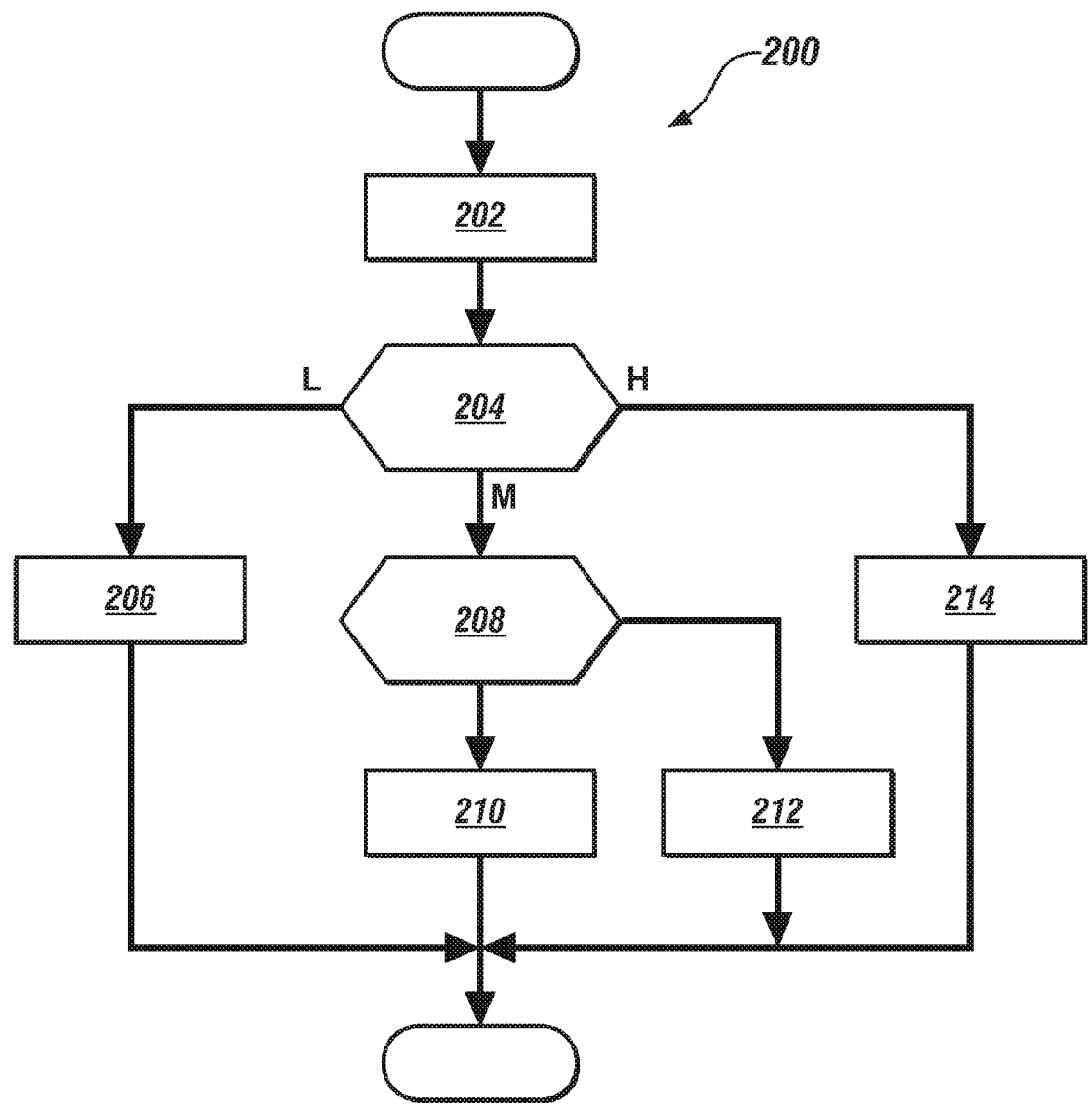
FIG. 5 is a process flow diagram illustrating a method of operating the exhaust gas treatment system and electrical system shown in FIG. 1.

A method of providing electrical power to the EHC device 16 will now be explained. Referring to FIG. 5, an exemplary process flow diagram illustrating an exemplary process of operating the exhaust gas treatment system 10 is generally indicated by reference number 200. Referring generally to FIGS. 1-5, process 200 begins at step 202, where a control module 80 includes control logic for monitoring the engine 12, and determines the generator speed based on the engine speed. Method 200 may then proceed to step 204.

In step 204, the control module 80 includes control logic for categorizing the generator speed. For example, the control module 80 may categorize the generator speed into a category of high, medium, or low. If the generator speed is low, method 200 may then proceed to step 206. In step 206, the first resistive path R1 and the second resistive path R2 will be connected to one another using a parallel configuration. Referring to FIGS. 2-3, the first switching element S1 connects the first electrode E1 with the generator 40, the second switching element S2 is connected to the ground 74, and the third switching element S3 connects the third electrode E3 with the generator 40. Method 200 may then terminate.

If the generator speed is medium, method 200 may then proceed to step 208. In step 208, the control module 80 determines if the first resistive path R1 or the second resistive path R2 is connected to the generator 40. The control module 80 includes control logic for modulating between the first resistive path R1 and the second resistive path R2 (e.g., the toggling schemes) to maintain a generally even temperature profile over the monolith 50 of the EHC device 16. The control module 80 may modulate between the toggling schemes based on an operating condition such as, for example, the temperature of the monolith 50 of the EHC device 16 or on an electrical power output of the generator 40. If the operating condition is less than a predetermined threshold value (e.g., if the temperature of the monolith 50 is below a specific temperature or if the electrical power output of the generator 40 is below a specified wattage), then method 200 proceeds to step 210, where the second resistive element R2 is connected to the generator 40 (e.g., the toggling scheme shown in FIG. 4A). Method 200 may then terminate.

If the operating condition is greater than a predetermined threshold value (e.g., if the temperature of the monolith 50 is above a specific temperature or if the electrical power output of the generator 40 is above a specified wattage), then method 200 proceeds to step 212, where the first resistive element R1 is connected to the generator 40 (e.g., the toggling scheme shown in FIG. 4B). Method 200 may then terminate.

If the generator speed is high, method 200 may then proceed to step 214. In step 214, the first resistive path R1 and the second resistive path R2 are connected to one another using a series configuration, where the first switching element S1 connects the first electrode E1 with the generator 40, the second switching element S2 is in the open position, and the third switching element S3 connects the third electrode E3 with the ground 76. Method 200 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system for an internal combustion engine, comprising:
    an exhaust gas conduit in fluid communication with, and configured to receive an exhaust gas from the internal combustion engine;
    a generator operating at a generator speed to produce electrical power;
    an electrically heated catalyst ("EHC") device in fluid communication with the exhaust gas conduit, the EHC device including a monolith structure that is divided into a plurality of segments that define discrete resistive paths, wherein the resistive paths are selectively connected to the generator for receiving electrical power; and
    a control module in communication with the EHC device, the generator, and the internal combustion engine, the control module including:
        a control logic for determining the generator speed; and
        a control logic for selectively connecting the resistive paths to the generator based on the generator speed, wherein a resistance of the selectively connected resistive paths is positively correlated to the generator speed.

2. The exhaust gas treatment system of claim 1, wherein the monolith structure includes a first resistive path and a second resistive path.

3. The exhaust gas treatment system of claim 2, wherein the EHC device includes a first electrode, a second electrode, and a third electrode that are in communication with the control module.

4. The exhaust gas treatment system of claim 3, wherein the first electrode selectively connects the first resistive path to the generator, the second electrode selectively connects the second resistive path to one of the generator and ground, and the third electrode selectively connects the first resistive path and the second resistive element to ground.

5. The exhaust gas treatment system of claim 4, wherein the generator operates at one of a high speed, a medium speed, and a low speed.

6. The exhaust gas treatment system of claim 5, wherein the first resistive path and the second resistive path are connected to one another using a parallel configuration if the generator operates at the low speed.

7. The exhaust gas treatment system of claim 5, wherein one of the first resistive path and the second resistive path are connected to the generator if the generator operates at the medium speed.

8. The exhaust gas treatment system of claim 7, wherein the control module includes control logic for toggling between connecting one of the first resistive path and the second resistive path based on an operating condition.

9. The exhaust gas treatment system of claim 8, wherein the operating condition is one of a temperature of the monolith of the EHC device and an electrical power output of the generator.

10. The exhaust gas treatment system of claim 5, wherein the first resistive path and the second resistive path are connected to one another using a series configuration if the generator at the high speed.

11. The exhaust gas treatment system of claim 1, wherein the generator provides electrical power to the EHC device during an unfueled braking event.

12. The exhaust gas treatment system of claim 1, wherein the generator includes an internal resistance, and wherein the resistive paths are selectively connected to the generator such that an overall resistance of the monolith is the same as the internal resistance of the generator.

13. An exhaust gas treatment system for an internal combustion engine, comprising:
    an exhaust gas conduit in fluid communication with, and configured to receive an exhaust gas from the internal combustion engine;
    a generator operating at a generator speed to produce electrical power, the generator including an internal resistance;
    an electrically heated catalyst ("EHC") device in fluid communication with the exhaust gas conduit, the EHC device including a monolith structure that is divided into a first resistive path and a second resistive path, wherein the first resistive path and the second resistive path are selectively connected to the generator for receiving electrical power; and
    a control module in communication with the EHC device, the generator, and the internal combustion engine, the control module including:
        a control logic for determining the generator speed; and
        a control logic for selectively connecting the first resistive path and the second resistive path to the generator based on the generator speed such that an overall resistance of the monolith is the same as the internal resistance of the generator, wherein the overall resistance of the monolith is positively correlated to the generator speed.

14. The exhaust gas treatment system of claim 13, wherein the EHC device includes a first electrode, a second electrode, and a third electrode that are in communication with the control module.

15. The exhaust gas treatment system of claim 14, wherein the first electrode selectively connects the first resistive path to the generator, the second electrode selectively connects the second resistive path to one of the generator and ground, and the third electrode selectively connects the first resistive path and the second resistive element to ground.

16. The exhaust gas treatment system of claim 15, wherein the generator operates at one of a high speed, a medium speed, and a low speed.

17. The exhaust gas treatment system of claim 16, wherein the first resistive path and the second resistive path are connected to one another using a parallel configuration if the generator operates at the low speed.

18. The exhaust gas treatment system of claim 16, wherein one of the first resistive path and the second resistive path are connected to the generator if the generator operates at the medium speed.

19. The exhaust gas treatment system of claim 18, wherein the control module includes control logic for toggling between connecting one of the first resistive path and the second resistive path based on an operating condition.

20. The exhaust gas treatment system of claim 16, wherein the first resistive path and the second resistive path are connected to one another using a series configuration if the generator at the high speed.

* * * * *